(No Model.)
H. O. LUND.
LATHE TOOL.
No. 255,083. Patented Mar. 14, 1882.
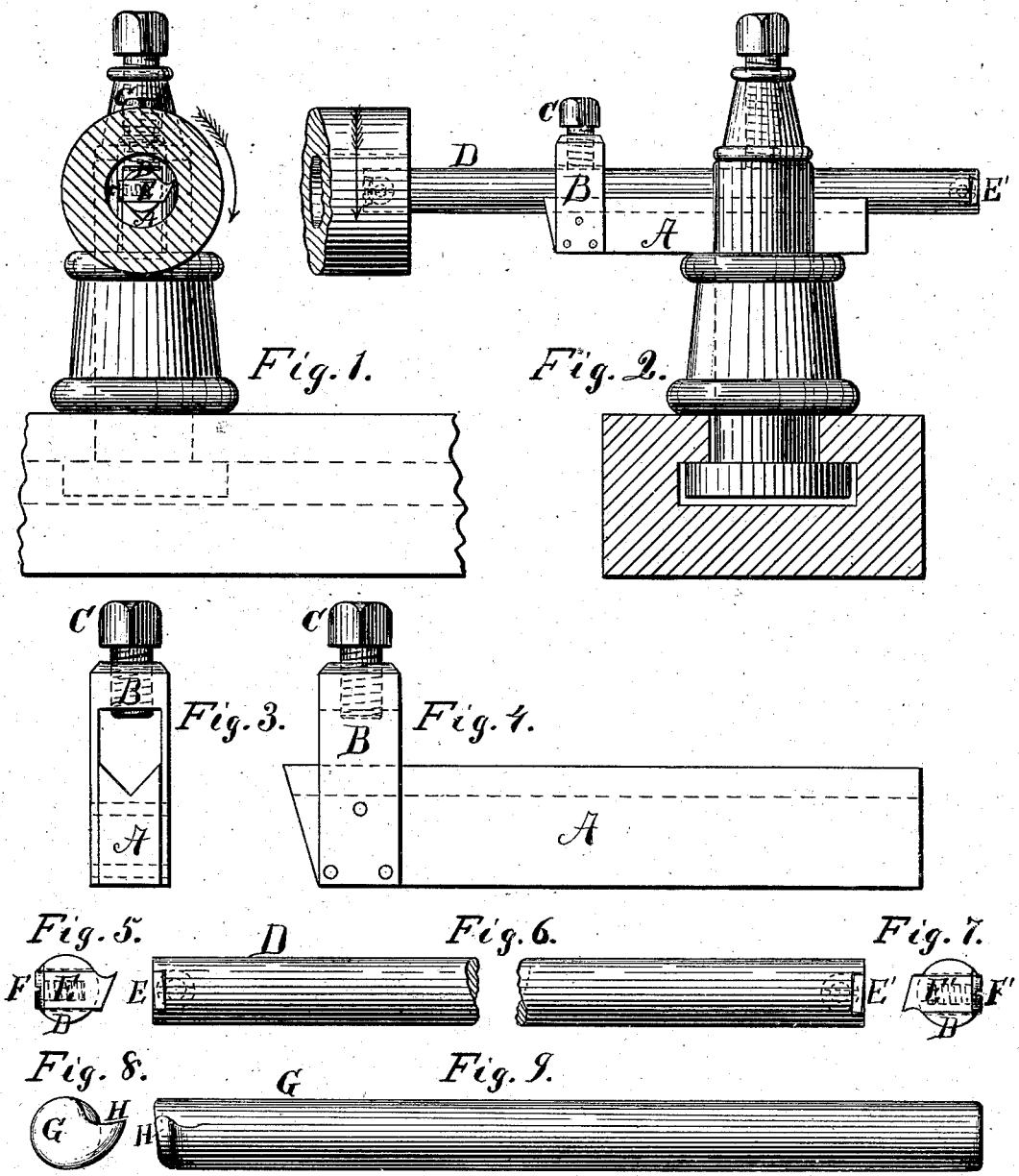

UNITED STATES PATENT OFFICE.

HENRY O. LUND, OF BRIDGEPORT, CONNECTICUT.

LATHE-TOOL.

SPECIFICATION forming part of Letters Patent No. 255,083, dated March 14, 1882.

Application filed December 1, 1881. (No model.)

*To all whom it may concern:*

Be it known that I, HENRY O. LUND, of the city of Bridgeport, in the county of Fairfield and the State of Connecticut, have invented a new and Improved Lathe-Tool for Turning Internal Surfaces and Screw-Cutting; and I do hereby declare the following to be a full, clear, and exact description of the construction and operation of the same, reference being had to the accompanying drawings, making a part of this specification.

Lathe-tools for internal-surface turning and screw-cutting have generally been made of a bar of fine quality of steel one inch by one-half inch, more or less, having a portion of one end forged small enough to enter the hole in the metal to be turned, and with a small cutting-lip upon the extreme end, the latter being tempered to do the work required of it, and as a great variety of sizes and lengths of holes are required to be made in the construction of machinery, a large number of tools of the above description are required to meet the demand, which are very expensive, both on account of the fine quality and large amount of stock used and the skill, labor, and time required to construct them so as to operate in a proper manner; and as it is sometimes necessary to remove the entire tool from the tool-post of the lathe, when a screw is only partially completed, to resharpen the lip, it is quite difficult to replace the same in its former position, but which it is necessary to do. This style of tool is quite objectionable, both to the owner and the operator; and my invention consists in constructing an internal-turning and screw-cutting tool in such a manner as to avoid the objections referred to and at the same time be quite as effective in its practical operation. This I accomplish by constructing the body of the tool of ordinary quality of steel and in such a form and manner as to receive another piece of ordinary round steel, but having a small independent detachable lip of fine quality of steel secured to one or both ends of the same, tempered in the usual manner, the whole being adjustable in the tool-post of a lathe to suit the various lengths of holes to be operated upon, all of which will herein be fully explained and described.

In the accompanying drawings, Figures 1 and 2 represent my improved turning-tool secured in its proper position in the tool-post of a lathe and with the lip of the same operating upon a revolving piece of metal. Figs. 3 and 4 are enlarged detached views of the body of my improved tool, showing the end and side of the same. Figs. 5, 6, and 7 are enlarged end and side views of the boring rod or bar, showing the manner of securing the fine-steel cutting-lips to the same, the left-end lip having such an inclination as is required for cutting right-hand internal screw-threads, and the right-end lip having such an inclination as is required for cutting left-hand screw-threads. The lips thus represented show the form required for cutting square threads; but the form of the cutting-edge may be changed so as to cut round or V threads, as desired by the operator. Figs. 8 and 9 show the form and manner in which a simple round rod of fine steel may be constructed for internal-surface turning, so as to be attached to the body of the tool and used in the manner represented for the screw-cutting tool, and thus avoid the fine steel and expensive body usually adopted.

Similar letters of reference indicate corresponding parts.

A is the body of my improved tool constructed of such a size and width as to enter the slot in the tool-post of a lathe, and having a V-shaped groove the entire length of the upper side of the same. A bridge, B, is secured to one end of said body, having a set-screw, C, passing through the same.

D is the boring bar or rod, having fine steel cutting-lips E E' secured to the ends of the same, said ends being dovetailed, as shown in the drawings, Fig. 6, the back ends of said cutting-lips resting against the heads of the adjusting-screws F F'.

G is a boring-bar, having a cutting-lip, H, forged upon one end of the same.

In using this tool it is evident that the position of the boring-bars D and G may be so adjusted in the tool-post of the lathe as to leave no unnecessary length of space between the body A and the metal to be turned, thus having the great advantage of making said boring-bars as stiff and rigid as the case will allow; and that the cutting-lips E and E' may be removed from their seats at any time during the cutting of a screw and replaced in precisely the same relation to the screw as it before occupied, as the boring-bar is not removed from the tool-post of the lathe or the feeding mechanism of the lathe disconnected.

I do not confine myself to the precise construction represented in the drawings; but

I claim as my invention and desire to secure by Letters Patent—

A tool for internal-surface turning or screw-cutting, consisting of the body A, having a V-shaped groove the entire length of the upper side of the same, and with a bridge, B, secured to one end, having a set-screw, C, passing through it, the boring-bar D, having seats at one or both ends of the same to receive the cutting-lips E and E', said boring-bar being secured in its proper position in the groove of the body A by means of the set-screw C, the whole being secured to the tool-post of a lathe and arranged to operate substantially as shown and described, for the object set forth.

HENRY O. LUND.

Witnesses:
I. B. SECOR,
H. F. NORCROSS.